United States Patent [19]

Chen et al.

[11] Patent Number: 5,372,765
[45] Date of Patent: Dec. 13, 1994

[54] CONTINUOUS PROCESS FOR EXTRUSION OF THERMOPLASTIC RESIN

[75] Inventors: Hsin-Hung Chen; Chuan-Pin Chen, both of Tainan, Taiwan, Prov. of China

[73] Assignee: Chi Mei Corporation, Taiwan, Prov. of China

[21] Appl. No.: 69,594

[22] Filed: Jun. 1, 1993

[51] Int. Cl.$^5$ .............................................. B29C 47/76
[52] U.S. Cl. ........................................ 264/101; 264/37; 264/40.7; 264/143; 264/177.18; 264/209.6; 264/211.24; 264/216; 264/236; 425/203; 425/382.3
[58] Field of Search ...................... 264/176.1, 101, 37, 264/236, 39, 347, 40.1, 102, 40.2, 216, 331.18, 349, 141–143, 209.6, 177.18, 40.7, 211.24; 425/382 R, 376.1, 203, 382.2, 382.3

[56] References Cited

U.S. PATENT DOCUMENTS

| | | | |
|---|---|---|---|
| 2,644,195 | 7/1953 | Bennes et al. | 264/37 |
| 4,013,745 | 3/1977 | Brinkmann et al. | 264/37 |
| 4,017,249 | 4/1977 | Lenk | 425/382.2 |
| 4,137,023 | 1/1979 | Moked et al. | 425/376.1 |
| 4,219,516 | 8/1980 | Herrington, Jr. | 264/176.1 |
| 4,409,167 | 10/1983 | Kolouch et al. | 264/102 |
| 4,664,859 | 5/1987 | Knoop | 264/331.18 |
| 4,692,290 | 9/1987 | Steele et al. | 264/143 |
| 4,708,619 | 11/1987 | Balk | 264/40.2 |
| 4,729,858 | 3/1988 | Chino et al. | 264/216 |
| 5,047,188 | 9/1991 | Okada et al. | 264/349 |

FOREIGN PATENT DOCUMENTS

| | | | |
|---|---|---|---|
| 0144572 | 10/1980 | Germany | 264/176.1 |
| 62-263308 | 11/1987 | Japan | 264/176.1 |

Primary Examiner—Jeffery R. Thurlow
Attorney, Agent, or Firm—Brooks & Kushman

[57] ABSTRACT

A continuous process for extrusion of thermoplastic resin of sheets, films, etc., is characterized by introducing devolatilized polymer melt into at least two branch streams, at least one of which is fed to an extrusion device and at least one of the remaining stream is connected to a pressure-adjusting device so as to obtain high quality extrusion products.

8 Claims, 2 Drawing Sheets

CONTINUOUS PROCESS FOR EXTRUSION OF THERMOPLASTIC RESIN

BACKGROUND OF THE INVENTION

1. Field of the Invention

This invention relates to a continuous process for extrusion of thermoplastic resin of sheets, films, pipes and profiles during the polymerization processes, more particularly to a process in which a pressure-adjusting device and at least one extrusion device are used for simplifying the extrusion process.

2. Description of the Related Art

At present, the process for manufacturing thermoplastic resin products, such as sheets, pipes, films, profiles, etc., comprises extruding a resin melt, which is produced from polymerization and devolatilization processes, into strands by means of a strand extruder. The strands are cooled by means of water cooling system or air cooling system. The cooled plastic strands are then cut into pellets by pelletizer and sieved by a sieving machine and then transferred to a storage container by means of air conveying. End users could make use of these pellets to produce thermoplastic sheets, pipes, films and profiles, etc. As in the case of making polymethyl methacrylate (PMMA) sheet and polystyrene (PS) sheet, the plastic pellets are first delivered to a mixing tank to mix with additives and pigments which form a uniform coating on the pellet surface followed by a drying step. The dried mixture is then fed to the hopper of a sheet extruder and is melted and passed through a "T die" to form the thermoplastic sheets.

As the above described, conventional the process for extrusion of thermoplastic resins of sheets has the following disadvantages:

(1) The polymerized and devolatilized plastic material must be treated by means of cooling, pelletizing, delivering and storing steps before being used for the end users, and then mixing, drying and extruding so as to form sheets, pipes, profiles etc. This process is complicated and a plurality of complicated devices or systems are utilized in order to carry out this process. As long as one of the devices is in trouble, the remaining steps of the process will be certainly interrupted. In addition, when the plastic pellets is conveying by air or mixing with additives, dust is generally produced, which is harmful to the health of operators.

(2) The invest for the tedious process, such as cooling, pelletizing, delivering, storing, drying and extruding are expensive. Problems of noise, high energy consumption of electricity, and wasted gas and water are also encountered.

(3) The process has a plurality of heat treatment steps including an additional screw extruding step, which may result in degradation of part of the resin, thereby result in a poor base color of the extrusion product.

To overcome aforementioned disadvantages, the conventional process must be simplified. That is to say, the steps of cooling, pelletizing, delivering, drying, extrusion melting must be eliminated from the process and the polymerized and devolatilized thermoplastic resin melt is directly fed into the extrusion device, such as sheeting die, to produce thermoplastic resin sheets directly. However, such a simplified process has a problem which cannot be solved at the present technical level. The problem is that, for example, in the process for extruding plastic sheets, when the polymerized and devolatilized molten resin is directly fed to the sheeting die, the sheeting process cannot be operated stably due to unsteady feeding of the molten resin. In addition, if the flow rate of the molten resin is disturbed an improper operation of extrusion device, the obtained plastic sheets will have a surface with wavy stripes. Therefore, sheets with an excellent surface quality and a uniform thickness cannot be obtained by means of the simplified process.

SUMMARY OF THE INVENTION

It is therefore a main object of this invention to provide a continuous process for extrusion of thermoplastic resin of sheets, films, pipes and profiles in which the steps of cooling, pelletizing, delivering, storing, drying, melting in the prior art can be eliminated in order to simplify the process, and in which the flow rate of the polymerized and devolatilized molten polymer is stable, so that a product of high quality can be obtained.

Accordingly, an aspect of this invention is that a continuous process for extrusion of thermoplastic resins comprises the steps of:

(1) polymerizing
 (a) at least one monomer selected from the groups of vinyl cyanide monomers, vinyl aromatic monomers and esters of methacrylic acid monomers, and
 (b) with or without the presence of rubbery polymer and/or solvent, to form a polymeric solution which contains 20–98 wt % of thermoplastic resin;

(2) delivering said polymeric solution into devolatilization zone to get rid of volatile contents and forming thermoplastic resin melt; and (3) introducing said thermoplastic resin melt into at least two branch streams, at least one of which is fed to an extrusion device and at least one of the remaining of which is connected to a pressure-adjusting device wherein said extrusion device comprising sheet extrusion device, film extrusion device, pipe extrusion device and profile extrusion device. The pressure-adjusting device adjusts the pressure of the thermoplastic resin melt and maintains a steady flow rate of the thermoplastic resin melt fed to the extrusion device and makes high quality extrusion products.

Other features and advantages of this invention will become apparent in the following detailed description of the preferred embodiments of this invention with reference to the accompanying drawings.

DETAILED DESCRIPTION OF THE PREFERRED EMBODIMENTS

Figure 1:
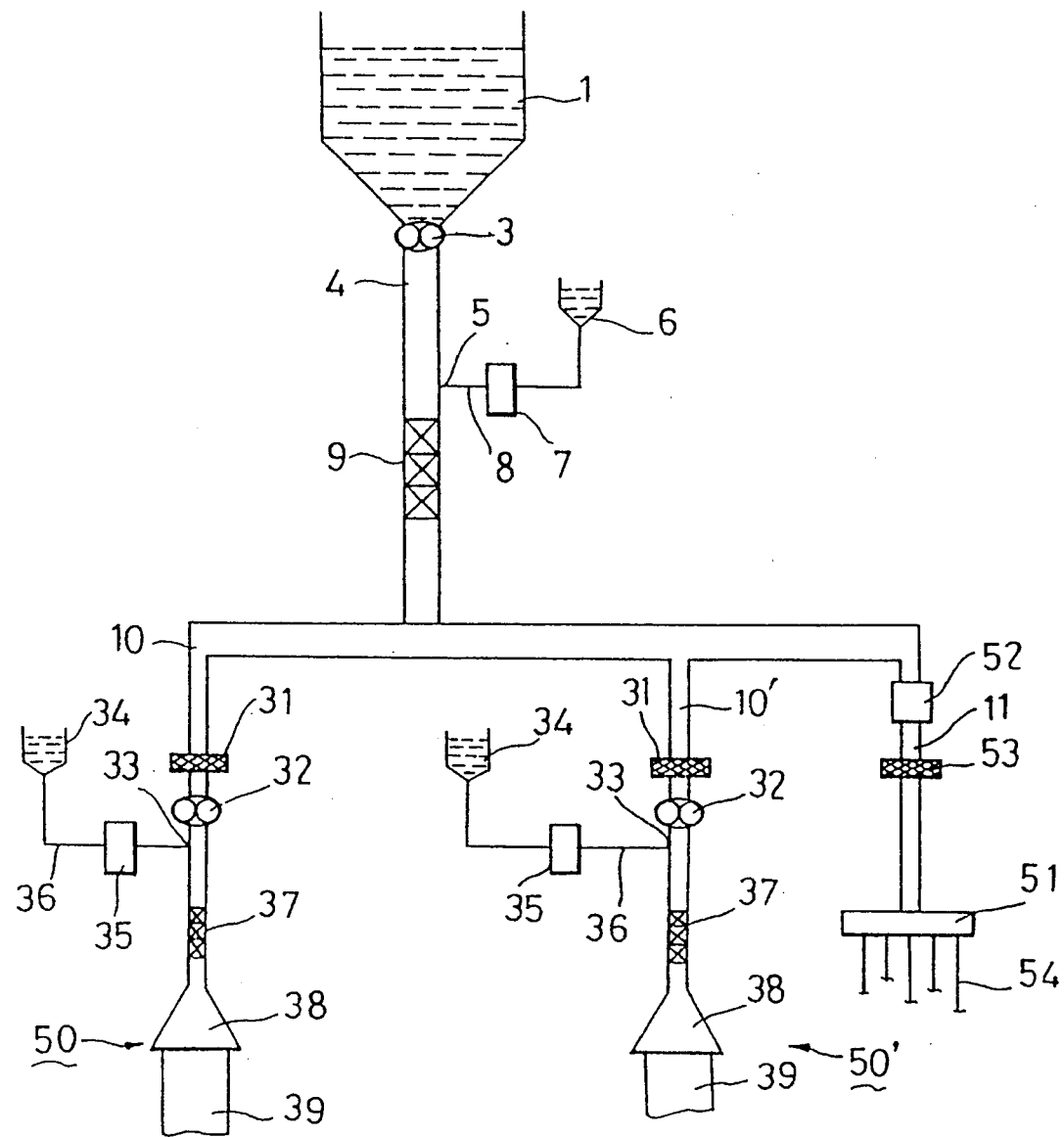
FIG. 1 is a schematic view of a first preferred embodiment of a continuous process for extrusion of thermoplastic resin.

Specifically, the extrusion products which is suitable for the process of this invention, includes sheets, pipes, films, and profiles of thermoplastic resins. Referring to FIG. 1, the process of this invention includes polymerizing monomer(s) to a conversion of at least 20% by weight by means of a conventional polymerization process, such as bulk polymerization, and solution polymerization. More specifically, the polymerization process of this invention is carried out by polymerizing at least one monomer selected from the following monomer groups in the presence of 0–20 wt % of rubbery polymer (the wt % is based on 100 wt % of the total feed composition whenever is used herein and hereinafter). The aforementioned monomer groups include vinyl cyanide monomers, vinyl aromatic monomers, and esters of methacrylic acid monomers, wherein vinyl cyanide monomers includes acrylonitrile, methacrylonitrile, fumaronitrile, etc.

Examples of vinyl aromatic monomers are styrene, α-methyl styrene, α-chlorostyrene, p-t-butylstyrene, p-methylstyrene, o-chlorostyrene, p-chlorostyrene, 2,5-dichlorostyrene, 3,4-dichlorostyrene, p-bromostyrene, o-bromostyrene, 2,5-dibromostyrene, 3,4-dibromostyrene, 2,4,6-tribromostyrene, etc.

Examples of methacrylic acid monomers are methyl methacrylate, ethyl methacrylate, propyl methacrylate, butyl methacrylate, benzyl methacrylate, hexyl methacrylate, lauryl methacrylate, 2-hydroxy methacrylate, glycidyl methacrylate, dimethyl aminoethyl methacrylate etc.

Examples of the rubber polymer are polybutadiene, styrene-butadiene random or block copolymer, hydrogenated polybutadiene or butadiene copolymer, acrylonitrile-butadiene copolymer, chloroprene rubber, isoprene rubber, natural rubber, ethylene-propylene rubber, EPDM, chlorinated polyethylene, chlorinated EPDM, acrylate rubbers, ethylene-vinylacetate copolymer, ethylene(meth)acrylate copolymer, ethylene-vinylacetateglycidyl acrylate, poly vinyl butyral, polyester elastomer, polyamide elastomer, etc.

In addition to the aforementioned monomers, there can be further added 0–50 wt % of other comonomers which are copolymerizable therewith to make a better modification of the resin. Other comonomers include derivatives of maleimide, esters of acrylic acid, acrylic acid monomers, methacrylic acid monomers, maleic anhydride, ethylene, propylene, 1-butene, 1-pentene, butadiene, vinyl chloride, etc.

The derivatives of maleimide include maleimide, N-methyl maleimide, N-ethylmaleimide, N-isopropyl maleimide, N-butyl maleimide, N-isopropyl maleimide, N-butyl maleimide, N-hexyl maleimide, N-octyl maleimide, N-lauryl maleimide, N-cyclohexyl maleimide, N-phenyl maleimide, N-2,3 dimethyl phenyl maleimide, etc.

The esters of acrylic acid monomers include methyl acrylate, ethylacrylate, propylacrylate, butylacrylate, benzylacrylate, hexyl acrylate, auryl acrylate, 2-hydroxy ethyl acrylate, glycidyl acrylate, etc.

In the polymerization process of this invention, 0–80 wt % of solvent can be added. Examples of the solvent are ethyl benzene, toluene, benzene, methyl ethyl ketone, acetone, hexane, cyclohexane, methanol, ethanol, propanol, isopropyl benzene etc.

The reactor used in the polymerization process may be CSTR or plug flow reactor or the combination thereof. One or more than one reactor may be connected in series or parallel manner.

The aforementioned monomers or the mixture of the monomers and the rubber polymer is polymerized in the reactor to obtain a thermoplastic resin solution in which the resin content is 20–98%. The obtained thermoplastic resin solution is then delivered into a devolatilization zone. The obtained thermoplastic resins which is suitable for this invention includes styrenic polymers, polymers of methacrylates. Examples of the styrenic polymers are polystyrene styrene-acrylonitrile resin, , rubber-modified styrenic polymer, such as high impact polystyrene, styrene-butadiene-acrylonitrile resin, styrene-EPDM-acrylonitrile resin, styrene-acrylate rubber-acrylonitrile resin. Examples of the polymers of methacrylates are methyl methacrylate-methyl acrylate resin, methyl methacrylate-ethyl acrylate resin, methyl methacrylate-styrene resin, methyl methacrylate resin, and rubber-modified methyl methacrylate polymer.

Figure 2:
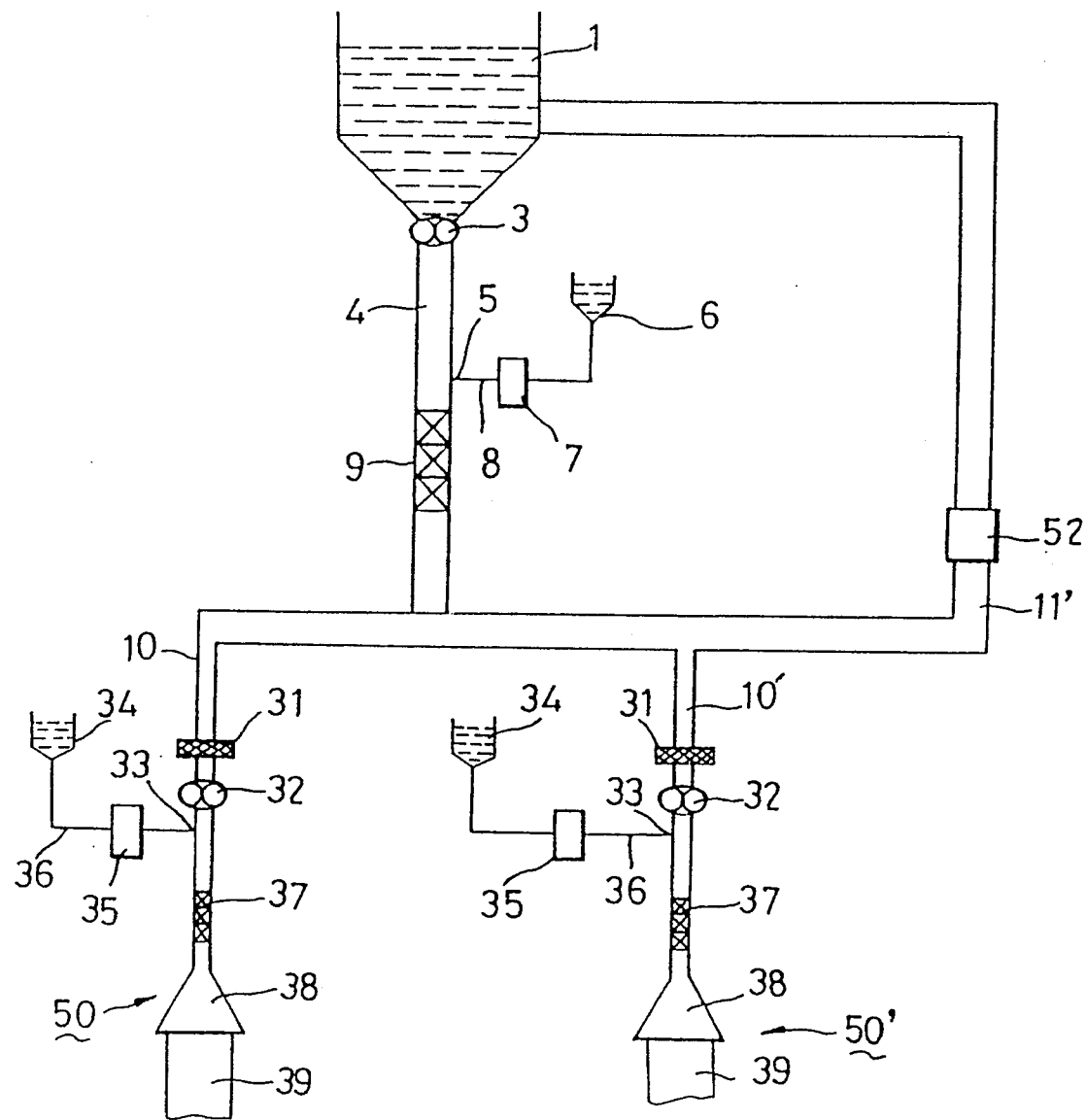
FIG. 2 is a schematic view of a second preferred embodiment of a continuous process for extrusion of thermoplastic resin.

A devolatilization tank 1 is generally used at the final stage of a conventional bulk or solution polymerization process. The function of the devolatilization tank 1 is to remove the residual monomers and solvents which contains in the polymeric solution. The bottom of the devolatilization tank 1 is connected to a main pipeline 4. A metering gear pump 3 is mounted between the devolatilization tank 1 and the main pipeline 4. The thermoplastic resin melt which has been devolatilized is charged from the devolatilization tank 1 to the main pipeline 4 via the metering gear pump As described above, if the thermoplastic resin melt is directly delivered from the main pipeline 4 to an extrusion device, such as die of sheet extrusion, and die of pipe extrusion, after leaving the devolatilization tank 1, the stability of the pressure and the flow rate of the resin in the extrusion device could not be obtained by means of merely the metering gear pump 3, which results in a poor quality product. In order to solve the problems stated above, thermoplastic resin melt passing the main pipeline 4 is introduced into at least two branch streams. In a preferred embodiment of this invention, which is best illustrated in FIG. 1, the main pipeline 4 is divided into three branch streams, which is denoted by numerals 10, 10' and 11, respectively. The branch streams, 10 and 10' are fed to the extrusion devices, 50 and 50', in order to carry out directly the extrusion processes. In addition, to control and adjust the pressure and the flow rate of the resin melt in the extrusion devices, 50 and 50', the branch stream 11 are connected to a pressure-adjusting device. Preferably, the pressure-adjusting device includes a perforated die 51 and a pressure controller 52 which is mounted upstream of the perforated die 51. The perforated die 51 is a die that can extrude strands of thermoplastic resins which is then water cooled and cut into pellets via the pelletizer. The pressure controller may be an orifice, a needle valve, a gate valve, or a globe valve. Further, referring to FIG. 2, the pressure-adjusting device may include a recycle pipeline 11' which has a pressure controller 52 connected thereto and which returns the resin melt to the devolatilization tank 1. Expansion joints may be provided in the connecting pipelines which are connected between the branch streams, 10, 10' and 11, and the main pipeline 4. When the pressure or flow rate of the resin in the main pipeline 4 is increased, the pressure controller 52 can be utilized to reduce the extrusion resistance of the perforated die 51. The increased flow rate of the resin is directed to the perforated die 51 via the branch stream 11. Thereby, the pressure and flow rate of the resin in the remaining branch streams, 10 and 10', which are connected to the extrusion devices, 50 and 50' can maintain at a steady state. Similarly, when the pressure or flow rate of resin in main pipeline 4 is reduced, the extrusion resistance of the perforated die 51 is increased with the use of the pressure controller 52, thereby reducing the output of the resin in the perforated die 51 which is connected to the branch stream 11. Therefore, the pressure and flow rate of the resin in the other two branch streams, 10 and 10', which are connected to the extrusion devices, 50 and 50' can maintain at a steady state.

In accordance with the present invention, the extrusion devices, 50 and 50', may be sheet extrusion device, film extrusion device, pipe extrusion device and profile extrusion device; to say it in detail, they are die of sheet extrusion, die of film extrusion, die of pipe extrusion and die of profile extrusion. Further, the filters 31 and the metering devices 32, such as gear pumps, single-screw extruders, and twin-screw extruders, are connected between the extrusion devices, 50 and 50', and the branch streams, 10 and 10' in order to remove the impurities from the resin and control the output of the resin at a steady state. The resin can thus pass through at a stable pressure and flow rate and can be made into sheets, pipes, films, profiles in the following steps. In the first preferred embodiment of this invention, each of the extrusion devices, 50 and 50', which extrudes the resin into a sheet 39 through T dies 38, as best illustrated in FIG. 1. The thickness of the sheet 39 can be adjusted by means of rollers.

The perforated die 51 not only can regulate the pressure of the branch streams, 10 and 10', but also can produce plastic strands. Referring to FIG. 1, a filter 53 is mounted between the perforated die 51 and the pressure controller 52 so as to improve the quality of the plastic strands 54 which are extruded from the perforated die 51. After the extruded plastic strands 54 are water cooled and pelletized, the pellet of thermoplastic resin may be supplied to the downstream factories in order to undergo various processing operations, such as injection molding, extrusion and thermoforming.

To meet the requirements of the appearance and physical properties of the extrusion products, additives may be added during the extrusion process of this invention as required. The additives may be lubricants, thermo-stabilizers, anti-oxidants, plasticizers, processing aids, pigments, dyes, bluing agents, fillers, UV absorbers, light stabilizers, flame retarding agents, flame retarding aid agents, carbon fibers, glass fibers, etc. In the preferred embodiments of this invention, a first additive-charging equipment is connected to the main pipeline 4 between gear pump 3 and static mixer 9. The other two additive-charging equipments are respectively connected to the branch streams, 10 and 10', between metering device 32 and static mixer 37. The first additive-charging equipment comprises a storage tank 6 and a first metering pump 7. The additives are charged into the main pipeline 4 through the pipeline 8 and the charge port 5. A static mixer 9 is provided in the main pipeline 4 in order to ensure that the additives can be mixed uniformly. Similarly, the other two additive-charging equipment comprise storage tank 34, metering pump 35, pipeline 36 and charging port 33. The additives which are prepared in advance and are stored in the storage tank 34 or storage tank 6 are pumped by the metering pumps 35 or metering pump 7 and charged into the branch streams, 10 and 10', respectively, through the pipelines 36. The additives are mixed uniformly by means of the static mixers 37 which are mounted between the metering devices 32 and the extrusion devices, 50 and 51'. The uniform mixture is then fed into the extrusion devices, 50 and 50', respectively, to preform the extrusion process.

The present invention is more specifically described and explained by means of the following Examples.

(Example 1)

A polymethyl methacrylate (PMMA) thermoplastic sheet is made in example 1 according to the process of this invention, as shown in FIG. 1. Polymerization process is ended in a devolatilization tank 1. Two extrusion devices, 50 and 50' are provided respectively with T dies 38. The first and second metering pumps, 7 and 35, which are mounted respectively to the first and second additive-charging equipments, are reciprocating pumps. The pressure controller 52 provided upstream of the perforated die 51 is a needle valve.

The operation conditions of example 1 are shown in Table 1.

TABLE 1

| | metering gear pump 3 | first extrusion device 50 | second extrusion device 50' | perforated die 51 | first metering pump 7 | second-metering pump 35 |
|---|---|---|---|---|---|---|
| Temp. (°C.) | 250 | 240 | 240 | 250 | 120 | 120 |
| Pressure (kg/cm²) | 95 | 60 | 55 | 72 | 96 | 56 |
| Output (kg/hr) | 750 | 250 | 300 | 200 | 3.8 | 0.15 |
| Clearance of the T die (m/m) | — | 3.6 | 8 | — | — | — |
| Sheet thickness (m/m) | — | 1.8 | 5 | — | — | — |
| Degree of open of needle valve (%) | — | — | — | 12 | — | — |

The initial feed of monomer of the PMMA polymerization process contains 97 wt % of methyl methacrylate and 3 wt % of methyl acrylate and the polymeric solution, formed with a resin content of 22 wt %, is composed of 200 parts of ethyl benzene and 100 parts of poly methyl methacrylate resin (PMMA) and its residual monomer. The polymeric solution is then devolatilized in devolatilization tank 1 and is pumped into the main pipeline 4 by means of the metering gear pump 3. The outlet pressure of the metering gear pump 3 is 95 kg/cm². The output of the metering gear pump 3 is 750 kg/hr at the temperature of 250° C. An additive, stearic acid, is charged into the main pipeline 4 through the charge port 5 by mean of the metering pump 7. The additive is charged at a flow rate of 3.8 kg/hr, a temperature of 120° C. and a pressure of 96 kg/cm². The polymethyl methacrylate resin and the additive then flow through the static mixer 9 and are mixed uniformly by the same.

Next, the main pipeline 4 is divided into three branch streams, 10, 10' and 11 which are respectively connected to first and second extrusion devices, 50 and 50', and a perforated die 51. The perforated die 51 can regulate and stabilize the flow rate and the pressure of the PMMA resin melt and can be used to produce plastic pellets. The needle valve, which serves as a pressure controller of the perforated die 51, has a degree of open of 12% so that the inlet pressure of the perforated die 51 is adjusted in the range from 70-80 kg/cm². The temperature of the perforated die 51 is set at 250° C. and output is 200 kg/hr, thereby maintaining the balance and stability of pressure and flow rate of the entire system. The plastic strands extruded from the perforated die 51 may be cooled by means of a water cooling bath with a temperature controlled in the range from 50°-60° C. The cooled plastic strands are pelletized by means of a pelletizer and polymethyl methacrylate pellets are obtained. The plastic pellets may be supplied to the downstream factories to undergo succeeding processing processes.

Pigment may be added to the PMMA resin in the branch streams, 10 and 10' by means of the metering pump 35. The metering pump 35 is operated at a temperature of 120° C., a pressure of 56 kg/cm² and a pumping flow rate of 150 kg/hr. The operation conditions of the first extrusion device 50 are as follows: extrusion temperature: 240° C.; pressure: 60 kg/cm²; output: 250 kg/hr; clearance of the T die: 3.6 m/m; thickness of the extrusion sheet: 1.8 m/m. The operation conditions of the second extrusion device 50' are as follows: extrusion temperature: 240° C.; pressure: 55 kg/cm²; output: 300 kg/hr; clearance of the T die: 8 m/m; thickness of the sheet: 5 m/m. The thickness of the extrusion sheet may be controlled by means of three rollers which is adjustable. The rollers have a temperature of 90°-96° C. and a rotating speed of 1.6 m/min. The sheet is cut according to the required length and a final product is obtained.

The sheet which is made by the process of this invention has a uniform thickness, a smooth and even surface, and an excellent appearance.

(Example 2)

The processes for extrusion PMMA sheet of Example 1 are repeated in Example 2. However, the operation conditions are changed as shown in Table 2 and the output of the metering gear pump 3 is increased from 750 kg/hr in Example 1 to 800 kg/hr in Example 2. It is found that the entire system pressure and flow rate are quickly approach a new steady state after an upset of the operation conditions and the sheet obtained has an excellent quality, appearance and base color.

TABLE 2

|  | metering gear pump 3 | first extrusion device 50 | second extrusion device 50' | perforated die 51 | first metering pump 7 | second-metering pump 35 |
| --- | --- | --- | --- | --- | --- | --- |
| Temp. (°C.) | 250 | 240 | 240 | 250 | 120 | 120 |
| Pressure (kg/cm²) | 95 | 60 | 55 | 72 | 96 | 56 |
| Output (kg/hr) | 800 | 250 | 300 | 200 | 3.8 | 0.15 |
| Clearance of the T die (m/m) | — | 3.6 | 8 | — | — | — |
| Sheet thickness (m/m) | — | 1.8 | 5 | — | — | — |
| Degree of open of needle valve (%) | — | — | — | 12 | — | — |

(Comparative example 1)

The pressure-adjusting device, such as the perforated die 51, or the recycle pipeline 11', is eliminated in this comparative example. The polymerization process is the same as example 1. The PMMA resin melt is pumped via main pipeline 4 and introduced into only two branch streams, 10 and 10' which are directly to two extrusion devices, 50 and 50'. The two extrusion devices, 50 and 50', are respectively provided with T dies. The operation conditions of each of the units in the extrusion molding process are shown in Table 3.

TABLE 3

|  | metering gear pump 3 | first extrusion device 50 | second extrusion device 50' | first metering pump 7 |
| --- | --- | --- | --- | --- |
| Temp. (°C.) | 250 | 240 | 240 | 120 |
| Pressure (kg/cm²) | 95 | 65 | 60 | 96 |
| Output (kg/hr) | 750 | 350 | 400 | 3.8 |
| Clearance of the T die (m/m) | — | 3.6 | 8 | — |
| Sheet thickness (m/m) | — | 1.8 | 5 | — |

Because lack of perforated die or recycle pipeline 11' for releasing pressure and flow rate, when the output or pressure of the resin melt in main pipeline 4 is changed, the variation of pressure or output directly influences the two downstream sheet extrusion devices. This results in wavy stripes on the surface and uneven thickness of the extruded sheet. In addition, when one of the sheet extrusion devices malfunctions and therefore shuts down, the PMMA resin in the devolatilization tank 1 will accumulate gradually, which finally causes the polymerization reaction to cease.

(Example 3)

The polystyrene resin solution which has a resin content of 52 wt % is formed by feeding 90 wt % of styrene and 10 wt % of ethyl benzene to the polymerization reactors under a reaction temperature between 70° C. and 250° C. The polymeric solution is then devolatilized and pumped into main pipeline 4 as in the example 1 except that the resin in main pipeline 4 is introduced into only two branch streams, 10 and 11 which are connected respectively to the first extrusion device 50 and the perforated die 51. That is, only one extrusion device and one perforated die are employed to produce the polystyrene sheet. The operation conditions are shown in Table 4. It is found that the plastic sheet obtained has a fairly good appearance and a uniform thickness.

TABLE 4

|  | metering gear pump 3 | first extrusion device 50 | first metering pump 7 |
|---|---|---|---|
| Temp. (°C.) | 210 | 205 | 215 |
| Pressure (kg/cm$^2$) | 74 | 54 | 56 |
| Output (kg/hr) | 500 | 225 | 275 |
| Clearance of the T die (m/m) | — | 8 | — |
| Sheet thickness (m/m) | — | 5 | — |
| Degree of open of needle valve (%) | — | — | 20 |

It can be seen that from the above described examples that the process for extrusion of thermoplastic resin of sheets, films, etc., eliminates the drawbacks in the prior art and simplifies the conventional process without affecting the quality of the product. A product which has a uniform thickness and good appearance can be obtained by employing the process of this invention with less energy consumption and lower equipment investment. In accordance with the present invention, various types of products may be produced by equipping with sheet, film, pipe, or other types of profile extrusion devices. The perforated die of strand extrusion of this invention not only can regulate the pressure and the flow rate of the resin, but also can produce pellets for the downstream factories.

In addition, another advantage of this invention is that when the extrusion device is shut down due to malfunction or other causes, the resin which is pumped out of the devolatilization tank can still be extruded out of the perforated die by turning off the metering devices 32 and reducing the flow resistance in stream 11. This can reduce the loss of the extrusion resin and prevent the accumulation of the resin in the devolatilization tank which would shut down the manufacturing processes.

With this invention thus explained, it is apparent that various modifications and changes can be made without departing from the scope and spirit of this invention, especially as defined in the following claims.

We claim:

1. A continuous process for extrusion of thermoplastic resins comprising the steps of:
   (1) polymerizing
      (a) at least one monomer selected from the groups consisting of vinyl cyanide monomers, vinyl aromatic monomers and esters of methacrylic acid and 0-50 wt % comohomers which are copolymerizable with said at least one monomer, and
      (b) with or without the presence of rubbery polymer and/or solvent, to form a polymeric solution which contains 20-98 wt % of thermoplastic resin;
   (2) delivering said polymeric solution into devolatilization zone to get rid of volatile contents and forming thermoplastic resin melt; and
   (3) introducing said thermoplastic resin melt into at least two branch streams, at least one of which is fed to an extrusion device and at least one of the remaining of which is connected to a pressure-adjusting device, said pressure-adjusting device including a perforated die for producing pellets, said perforated die being adjustable in order to maintain the pressure and flow rate of said extrusion device at a given level, wherein said extrusion device comprising sheet extrusion device, film extrusion device, pipe extrusion device and profile extrusion device.

2. A continuous process for extrusion of thermoplastic resins as claimed in claim 1, wherein said pressure-adjusting device further includes a pressure controller provided upstream of said perforated die.

3. A continuous process for extrusion of thermoplastic resins as claimed in claim 2, wherein said pressure controller is a needle valve.

4. A continuous process for extrusion of thermoplastic resins as claimed in claim 1, wherein said extrusion device has a metering device connected upstream.

5. A continuous process for extrusion of thermoplastic resins as claimed in claim 4, wherein said metering device is a gear pump.

6. A continuous process for extrusion of thermoplastic resins as claimed in claim 1, wherein said thermoplastic resin consisted of polystyrene, rubber modified styrenic polymer, poly methyl methacrylate and rubber modified methyl methacrylate polymer.

7. A continuous process for extrusion of thermoplastic resins as claimed in claim 6 wherein said styrenic polymers consists of polystyrene, styrene-acrylonitrile resin, and rubber modified styrenic polymers.

8. A continuous process for extrusion of thermoplastic resins as claimed in claim 6 wherein said polymers of methacrylates consists of methyl methacrylate-methyl acrylate resin, methyl methacrylate-ethyl acrylate resin, methyl methacrylate-styrene resin, methyl methacrylate resin, and rubber-modified methyl methacrylate polymers.

* * * * *